United States Patent
Dreher et al.

(10) Patent No.: US 7,472,616 B2
(45) Date of Patent: Jan. 6, 2009

(54) STEP-BY-STEP VARIABLE TRANSMISSION AND METHOD FOR CONTROLLING THE SAME

(75) Inventors: Patrick Dreher, Bad Duerrheim (DE); Martin Seufert, Steinheim (DE); Frank Nageleisen, Kirchzarten (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 0 days.

(21) Appl. No.: 11/775,134

(22) Filed: Jul. 9, 2007

(65) Prior Publication Data

US 2008/0006107 A1     Jan. 10, 2008

Related U.S. Application Data

(63) Continuation of application No. PCT/EP2005/013376, filed on Dec. 13, 2005.

(30) Foreign Application Priority Data

Jan. 25, 2005    (DE) .................. 10 2005 004 339

(51) Int. Cl.
*F16H 59/00* (2006.01)
*F16H 61/00* (2006.01)
*F16H 63/00* (2006.01)

(52) U.S. Cl. ................. 74/336 R; 74/335; 74/339; 74/340

(58) Field of Classification Search .......... 74/335, 74/339, 336 R, 340; 701/51
See application file for complete search history.

(56) References Cited

U.S. PATENT DOCUMENTS

| | | | |
|---|---|---|---|
| 4,393,732 | A | 7/1983 | Suzuki et al. |
| 4,955,258 | A | 9/1990 | Ito et al. |

(Continued)

FOREIGN PATENT DOCUMENTS

DE    30 36 389    4/1981

(Continued)

OTHER PUBLICATIONS

PCT Search Report, Application No. PCT/EP2005/013376, Dated Jan. 25, 2005.

(Continued)

*Primary Examiner*—David D. Le
(74) *Attorney, Agent, or Firm*—Knobbe, Martens, Olson & Bear, LLP

(57) ABSTRACT

A method for controlling an automated step-by-step variable transmission which has a plurality of gear stages which set up a different transmission ratio in each case. The method comprises the steps: a) detecting whether a gear stage is to be engaged, b) detecting an input actual variable which is substantially proportional to an input rotational speed of the step-by-step variable transmission, and an output actual variable which is substantially proportional to an output rotational speed of the transmission, c) checking as to whether a difference between a ratio of the input and the output actual variables and the transmission ratio which would be set up by the gear stage is smaller for a predefined timespan than a predefined tolerance range, and d) determining a fault state if the difference does not lie within the tolerance range for the predefined timespan.

11 Claims, 2 Drawing Sheets

U.S. PATENT DOCUMENTS

| | | | |
|---|---|---|---|
| 4,957,016 A * | 9/1990 | Amedei et al. | 74/336 R |
| 5,033,328 A | 7/1991 | Shimanaka | |
| 5,157,607 A | 10/1992 | Stainton et al. | |
| 5,521,818 A | 5/1996 | Palansky et al. | |
| 5,947,867 A | 9/1999 | Gierer et al. | |
| 6,095,001 A * | 8/2000 | Ruehle et al. | 74/331 |
| 6,456,919 B1 | 9/2002 | Korner et al. | |
| 6,502,474 B2 * | 1/2003 | Sakamoto et al. | 74/325 |
| 6,604,438 B2 * | 8/2003 | Ruhle et al. | 74/335 |
| 6,679,133 B1 * | 1/2004 | Kayano et al. | 74/335 |
| 6,883,394 B2 * | 4/2005 | Koenig et al. | 74/335 |
| 2007/0214906 A1 * | 9/2007 | Fahland et al. | 74/340 |

FOREIGN PATENT DOCUMENTS

| | | |
|---|---|---|
| DE | 38 43 101 | 7/1989 |
| DE | 690 07 458 | 9/1994 |
| DE | 196 15 267 | 6/1997 |
| DE | 196 01 618 | 7/1997 |
| DE | 198 54 254 | 5/2000 |
| DE | 198 57 961 | 6/2000 |
| DE | 199 08 831 | 9/2000 |
| DE | 100 31 754 | 1/2001 |
| DE | 103 13 483 | 10/2004 |
| DE | 103 18 498 | 11/2004 |
| EP | 0 438 917 | 12/1990 |
| EP | 0 459 274 | 5/1991 |
| EP | 0 733 508 | 10/1995 |
| EP | 0 719 967 | 7/1996 |
| EP | 1 467 128 | 10/2004 |

OTHER PUBLICATIONS

PCT International Preliminary Report on Patentability, Application No. PCT/EP2005/013376, Dated Dec. 13, 2005.

* cited by examiner

STEP-BY-STEP VARIABLE TRANSMISSION AND METHOD FOR CONTROLLING THE SAME

CROSS-REFERENCE TO RELATED APPLICATIONS

This is a continuation application to international patent application PCT/EP2005/013376, filed Dec. 13, 2005, which claims the priority of German patent application DE 10 2005 004 339, filed Jan. 25, 2005.

BACKGROUND OF THE INVENTION

The present invention relates to a method for controlling an automated step-by-step variable transmission, in particular for motor vehicles, with the step-by-step variable transmission having a plurality of gear stages which set up a different transmission ratio in each case.

The present invention also relates to an automated step-by-step variable transmission, in particular for motor vehicles, having a plurality of gear stages which set up a different transmission ratio in each case, with it being possible for the gear stages to be engaged and disengaged by means of associated actuators, and having a control device for activating the actuators.

Automated step-by-step variable transmissions of said type encompass in particular so-called automated shift transmissions and also so-called twin-clutch transmissions as well as other multiple-clutch transmissions.

With all types of step-by-step variable transmission, it is to be avoided that two gear stages are engaged at the same time in one transmission (or in the case of multiple-clutch transmissions, in one partial transmission). This is because this would lead to locking of the drivetrain and therefore to locking of the drive axle.

In conventional manual-shift step-by-step variable transmissions, a mechanical gear lock or gear locking mechanism is provided for this purpose.

Mechanical gear locks of said type lead to increased costs and an increased weight of the step-by-step variable transmission. Furthermore, when using gear locks of said type, it is often difficult to obtain short shift times. This is because a mechanical gear lock is generally constructed such that a gear stage can only be engaged once all the gear stages have firstly been completely disengaged.

SUMMARY OF THE INVENTION

Against the above background, it is the object of the present invention to provide an improved method for controlling an automated step-by-step variable transmission, a method for the early detection of a fault in an automated step-by-step variable transmission, and an automated step-by-step variable transmission in which methods of said type are implemented, with it being possible without the provision of a mechanical gear lock to prevent that two gear stages are engaged at the same time or that, when one gear stage is engaged, a further gear stage is engaged.

Said object is achieved according to a first aspect of the invention by means of a method for controlling an automated step-by-step variable transmission, in particular for motor vehicles, with the step-by-step variable transmission having a plurality of gear stages which set up a different transmission ratio in each case, having the steps:

a) detecting whether a gear stage is to be engaged,
b) detecting an input actual variable which is substantially proportional to an input rotational speed of the step-by-step variable transmission, and an output actual variable which is substantially proportional to an output rotational speed of the transmission,
c) checking as to whether a difference between a ratio of the input and the output actual variables and the transmission ratio which would be set up by the gear stage is smaller for a predefined timespan than a predefined tolerance range, and
d) determining a fault state if the difference does not lie within the tolerance range for the predefined timespan.

The above object is also achieved as per a second aspect of the invention by means of a method for the early detection of a fault in an automated step-by-step variable transmission, in particular for motor vehicles, wherein, when a gear stage is already engaged, it is determined by monitoring and checking a plurality of parameters of the transmission as to whether an impermissible attempt is being carried out to engage a further gear stage.

Finally, the above object is achieved by means of an automated step-by-step variable transmission, in particular for motor vehicles, having a plurality of gear stages which set up a different transmission ratio in each case, with it being possible for the gear stages to be engaged and disengaged by means of associated actuators, and having a control device for activating the actuators, wherein a method according to the first or the second aspect of the invention is implemented in the control device.

By means of the invention, it is possible for a fault state in the automated step-by-step variable transmission, which could lead to a second gear stage being engaged while driving, to be detected early. It is hereby possible to dispense with a mechanical gear lock.

The automated step-by-step variable transmission therefore has a lower weight and can be produced at reduced cost. There is also a functional improvement, since faster shift times are possible, in particular by means of overlapping actuation when disengaging a start gear (source gear) and when engaging a target gear.

The object is therefore achieved in its entirety.

In the method according to the invention as per the first aspect, it is particularly advantageous if the steps a) to d) are carried out when another gear stage (start gear stage) is already engaged.

Although it is generally sensible to carry out the method according to the invention regardless of whether another gear stage is already engaged, in particular in order to check as to whether a gear stage to be engaged is appropriate to the present conditions of for example driving speed and engine rotational speed, it is particularly preferable to carry out a check of said type when a gear stage is already engaged.

It is hereby possible to detect early whether, on account of a fault, an attempt is inadvertently made to engage a further gear stage.

In the method according to the invention as per the first aspect, it is also advantageous if the steps a) to d) are carried out when the output actual variable is greater than a predefined threshold value.

The method according to the invention is hereby carried out only when the step-by-step variable transmission is also actually being utilized to provide drive, that is to say for example when the vehicle is driving at a certain minimum speed (which corresponds to the threshold value). This is because a dangerous situation can only occur as a result of the engagement of two gear stages when the vehicle is at a certain minimum speed.

It is advantageous overall if the state in which it is inadvertently sought to engage a further gear stage is detected by virtue of the corresponding shift clutch of said gear stage being actuated.

If the shift clutch is designed as a locking synchronization device, the engagement of a further gear stage is initially prevented on account of the locking constraint. This is because there is a rotational speed difference at the further gear stage at this time.

On the one hand, in the event of an attempt of said type, however, the locking synchronization device is possibly unnecessarily loaded. On the other hand, it is of course conceivable for an actuator to overcome the loading limit of the locking synchronization device, that is to say to "break through" the locking constraint (for example by pressing for an excessively long time against the synchronizing ring).

In order to prevent this, it is ensured early by monitoring (detecting whether a gear stage is to be engaged) that the attempt to engage the further gear can be aborted before a dangerous situation, or a situation which could damage the synchronization device, can occur.

In the method as per the first aspect, monitoring is carried out with regard to whether the transmission ratio of the further gear stage is "appropriate" to the actual state (for example, whether speed of the vehicle and engine rotational speed are "appropriate"). In order to prevent here that, by chance, a transient state is "appropriate", but only for a brief moment, it is checked for a predefined timespan as to whether the present driving state is "appropriate". Only when this is the case can it be assumed that the engagement of the further gear stage is expedient.

In this case, a fault can for example result from a sensor, which would have to detect the disengagement of the start gear, being faulty. This is because if, over a relatively long time, the actual state of the drive side for the gear stage to be engaged corresponds to its transmission ratio, it is possible according to the laws of logic for no other gear stage to be engaged.

There are however also further possibilities for detecting whether a further gear stage is to be engaged. Said various possibilities can generally be used in each case individually instead of the transmission ratio check in step c) of the method as per the first aspect. Said detection methods are however preferably combined with one another in order to be able to detect and address the greatest possible number of different faults.

It is therefore for example advantageous in the method as per the first aspect if it is detected as to whether a gear stage is to be engaged by virtue of it being detected as to whether an electrical activating current which is supplied to an actuator which is assigned to the gear stage is greater than a current threshold value. This is because if an actuator of said type is supplied with electrical current, specifically with a value greater than the current threshold value (below which usually no reaction of the associated shift clutch can be expected), then the gear stage must inevitably also be engaged (for example the associated shift rod must move).

According to a further advantageous embodiment, it is detected as to whether a gear stage is to be engaged by virtue of a force, with which a shift member for engaging the gear stage is moved, being detected.

It is hereby possible for the force detection to be carried out indirectly by means of the activating current of the actuator, though said force detection can also be carried out by means of a separate force/pressure sensor on the actuator system.

In a further preferred embodiment, it is detected as to whether a gear stage is to be engaged by virtue of a pressure of a fluid actuator, by means of which a shift member for engaging the gear stage is actuated, being detected.

If a fluid actuator, for example a hydraulic actuator, is used as an actuator, then the pressing force for engaging the gear stage can for example be detected indirectly by means of the fluid pressure or hydraulic pressure.

It is of course also possible to monitor the travel of the shift clutch (shift sleeve, shift rod) (for example by means of contact or non-contact sensors such as Hall sensors).

It is also advantageous overall if, after the determination of the fault state, it is detected as to whether a separating clutch device which is connected to the input of the transmission is separated or not.

If it is determined that the separating clutch device is not separated, it can be concluded that no severe fault state is present which makes it immediately necessary to shut down the vehicle. Such a fault state can in fact then be initially evaluated as a momentary lack of progress in the engagement process.

The detection as to whether a separating clutch device which is connected to the input of the transmission is separated or not is usually detected by means of a sensor. In the event of the occurrence of a fault state, it can however be the case that the clutch sensor has failed. In the context of the method according to the invention, it is therefore preferably detected as to whether or not the separating clutch device is separated by virtue of it being checked as to how long the engine and the transmission input rotational speed lie within a certain tolerance window.

When the fault state has occurred and, with the repeated check on account of the transmission input rotational speed and engine rotational speed, it is determined that the separating clutch device is open, the occurrence of the fault must be evaluated as a serious fault, so that a shut-down preferably takes place in order to avoid further danger.

Here, it is for example possible to shut off all of the actuators, for example switch all of the actuators to a currentless state, so that dangerous situations are avoided by means of the conventionally installed "fail-safe" mechanisms.

In a motor vehicle, such a state is usually indicated by means of an alarm message, and the defective system and therefore also the vehicle are placed into a safe state. This can, in the extreme case, lead to the vehicle being brought to standstill ("breakdown").

In the automated step-by-step variable transmission according to the invention, it is particularly advantageous if the step-by-step variable transmission has no mechanical gear lock.

In said transmission, it is also particularly advantageous if the gear stages can be engaged by means of synchronized shift clutches, in particular by means of locking synchronization devices.

This is because, with said type of shift clutch, it is possible in a comparatively simple manner (for example by means of the pressing force) to determine whether an attempt is being made to engage a gear.

It is also self-evident that the automated step-by-step variable transmission preferably has at least two actuators which can be actuated independently of one another, for example two shift drums which in each case operate a separate group of gear stages. It is for example alternatively also conceivable that a separate actuator is provided for each shift clutch pack or for each shift rod for actuating a shift clutch pack of said type.

The present invention is however generally also beneficial when the gear stages of the step-by-step variable transmission are shifted by means of a central shift shaft or the like.

When using the invention on a twin-clutch transmission (or some other multi-clutch transmission), the simultaneous engagement of gear stages which belong to different partial transmissions is not only permitted but also desirable.

In the case of a twin-clutch transmission, the engagement of a second gear in one partial transmission must be prevented (locking). The engagement of a second gear in the other partial transmission is, as mentioned, possible (no locking), but can be monitored for correctness (correct transmission ratio at the target gear) by the diagnostic method according to the invention. If the transmission ratio at the target gear is incorrect, then there is on the one hand the risk of an excessive rotational speed at the clutch and of the destruction of the driver disc, and on the other hand, if the clutch is closed at an excessive rotational speed, there is the risk of the destruction of the engine or of spinning of the rear axle. This can be covered by the diagnostic method according to the invention. The same of course also applies to automated shift transmissions with non-overlapping shifts.

By means of the method according to the invention or the preferred embodiments thereof, it is possible for in each case at least one of the following faults in an automated step-by-step variable transmission to be detected ("diagnosed") and suitably addressed:

a shift member breakage, such as a shift fork breakage,
a sensor fault, wherein for example a sensor of a gear which is to be disengaged signals that the gear is no longer engaged even though this is still the case,
software faults,
cabling fault (for example a valve of a hydraulic actuator or an electrical motor actuator is supplied with current even though this is not desired),
control unit hardware fault.

The method according to the invention is preferably always carried out when it is detected that a gear stage is to be engaged. By checking the intended and actual transmission ratios, it is therefore always prevented that an incorrect gear stage is inadvertently engaged or a gear stage is engaged at an unfavorable time or under unfavorable boundary conditions.

It is hereby possible in particular to prevent that, when one gear stage is already engaged, a further gear stage is inadvertently also engaged.

It is self-evident that the features stated above and the features yet to be explained below can be used not only in the combination specified in each case but also in other combinations or individually without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing.

DETAILED DESCRIPTION OF THE INVENTION

Figure 1:
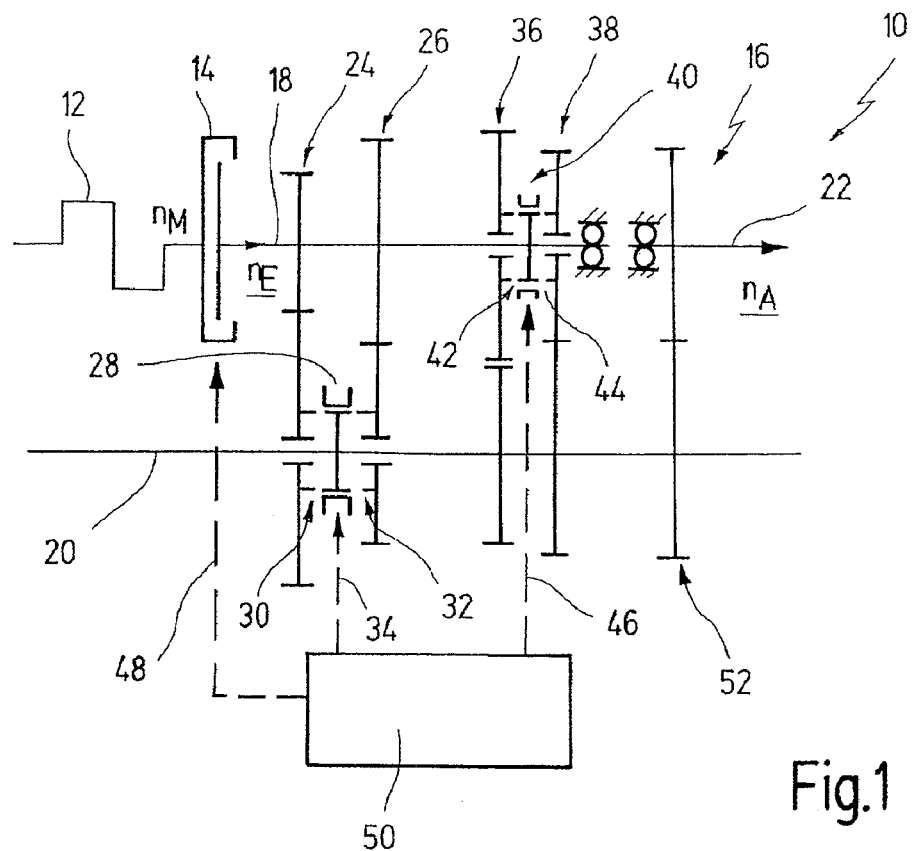
FIG. 1 is a schematic illustration of an embodiment of an automated step-by-step variable transmission according to the invention.

In FIG. 1, an automated drivetrain for a motor vehicle, in particular a passenger vehicle, is denoted generally by 10.

The drivetrain 10 has a drive engine such as an internal combustion engine 12, a separating clutch 14 which is connected to the output of the drive engine 12, and an automated step-by-step variable transmission 16 which is connected to the output of the separating clutch 14.

An input shaft 18 of the step-by-step variable transmission 16 is connected to an output member of the separating clutch 14. The rotational speed of the input shaft 18 is denoted by nE. The rotational speed of the input member of the separating clutch 14, that is to say the rotational speed of the drive engine 12, is denoted by nM.

The step-by-step variable transmission 16 has a countershaft 20, which is parallel to the input shaft 18, and an output shaft 22 which is aligned coaxially with respect to the input shaft 18 and whose rotational speed is nA.

The step-by-step variable transmission 16 also has at least one first gear set 24 and one second gear set 26 which can be engaged and disengaged by means of a first shift clutch pack 28.

The first shift clutch pack 28 has a first shift clutch 30 for shifting the first gear set 24 and a second shift clutch 32 for shifting the second gear set.

The shift clutch pack 28 can be actuated in an automated fashion by means of a first actuator 34.

The step-by-step variable transmission 16 also has a third gear set 36 and a fourth gear set 38 which can be shifted by means of a second shift clutch pack 40. More precisely, the second shift clutch pack 40 has a third shift clutch 42 for the third gear set 36 and a fourth shift clutch 44 for the fourth gear set 38.

The shift clutches 30, 32, 42, 44 are in each case designed as locking synchronizing clutches.

The second shift clutch pack 40 can be actuated by means of a second actuator 46.

Also provided is a schematically indicated third actuator 48 for actuating the separating clutch 14.

The actuators 34, 46, 48 are activated by a control device 50 which is operated by means of superordinate control algorithms.

The step-by-step variable transmission 16 is illustrated as a transmission with a drive output constant 52.

It is however self-evident that the step-by-step variable transmission 16 can also be designed in the usual arrangement with a drive input constant.

In addition, the drivetrain 10 can also be designed as a twin-clutch transmission. Here, the single separating clutch 14 is replaced with a twin clutch, and the single input shaft 18 is replaced with two usually coaxial input shafts.

Each of the gear sets 24, 26, 36, 38 corresponds to in each case one gear stage. The number of gear stages is merely exemplary.

The step-by-step variable transmission 16 has no mechanical gear lock. It is therefore possible from a mechanical point of view to engage more than one gear stage simultaneously.

In driving operation, this is however prevented by means of an electronic control method of the control device 50, so that the step-by-step variable transmission 16 is equipped with an "electronic" or control-implemented gear lock.

The actuators 34, 46 can for example be embodied as individual actuators for a respective shift clutch pack. The actuators 34, 46 can however also be formed for example by two shift drums. It is generally also conceivable for the actuators 34, 46 to be formed by one individual actuator for actuating a central shift shaft.

Particularly preferable, however, is an embodiment of the step-by-step variable transmission 16 in which at least two actuators can be actuated independently of one another. It is hereby possible to carry out gear changes, that is to say the disengagement of a start gear and the engagement of a target gear, in an overlapping fashion, in order to thereby shorten shift times.

Figure 2:
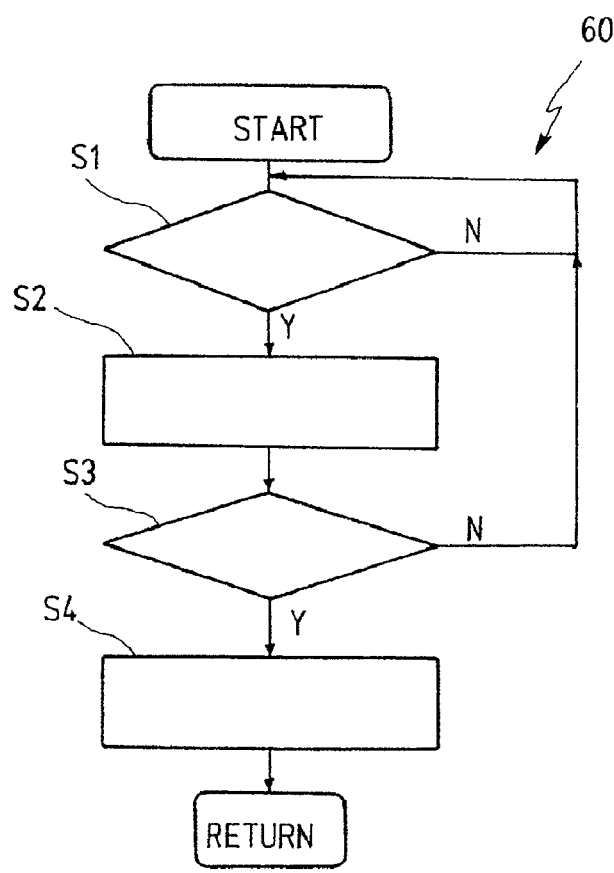
FIG. 2 shows a flow diagram of one embodiment of the method according to the invention.

FIG. 2 shows a flow diagram of a first embodiment of the method according to the invention, with the flow diagram being denoted generally by 60.

The flow diagram 60 constitutes a control method for an automated step-by-step variable transmission 16, specifically for the early detection of fault situations, and comprises, after a start step, a step S1 in which it is detected as to whether a gear stage is to be engaged.

Here, the step S1 preferably runs independently of the usual actuating signals of the control device 50 (that is to say for example independently of a flag, signaling that a gear is to be engaged, in the main program of the control device 50). It is in fact detected independently of this as to whether a gear stage is to be engaged by virtue of at least one, though preferably any desired combination of the following individual detection steps being carried out:

it is detected as to whether the actuator system of the gear stage is actuated, that is to say whether a current of an actuating valve of a hydraulic actuator or a current of an electromotive actuator is above a certain threshold value, a sensor system signals a movement of shift members of the related gear stage, a force/pressure sensor is provided which measures a pressing force of the shift clutch of the related gear stage, a fluid pressure of a hydraulic actuator for actuating the shift clutch of the related gear stage is monitored.

In the step S1, preferably all of the gear stages of the step-by-step variable transmission are queried.

If it is not detected in step S1 that a gear stage is to be engaged (N in step S1), then for the fault detection method which is being carried out, a correct state is present, and the program returns to the start.

If it is detected that a gear stage is to be engaged (Y in step S1), then in a step S2, an input actual variable, which is substantially proportional to an input rotational speed $n_E$ of the step-by-step variable transmission 16, and an output actual variable, which is substantially proportional to an output rotational speed $n_A$ of the output shaft 22 of the transmission, are detected. In other words, it is detected in step S2 as to how fast the motor vehicle is travelling, and the input rotational speed $n_E$ of the step-by-step variable transmission 16 is detected.

In the following step S3, it is checked as to whether a difference $\Delta R$ between a ratio of the input and the output actual variables (that is to say the present transmission ratio in the transmission) and the transmission ratio which would be or is to be set up by the gear stage is smaller or greater for a predefined timespan than a predefined tolerance range.

As a result of the measure that said check is carried out for a predefined timespan (which can for example lie in the range from 100 to 2000 milliseconds), it can be ensured that an incorrect evaluation on account of a transient state is prevented.

If the difference $\Delta R$ is not continuously greater for the predefined timespan than the predefined tolerance range (N in step S3), it is assumed that the present transmission ratio is appropriate to the transmission ratio of the gear stage which is to be engaged, and it is assumed that the state is correct. The method returns to the starting point. The gear stage can be engaged.

In the other case, that is to say if the difference $\Delta R$ is greater for a predefined timespan than a predefined tolerance range, that is to say the transmission ratio of the gear stage which is to be engaged does not correspond to the present state (Y in step S3), then in step S4, a fault state is determined.

Figure 3:
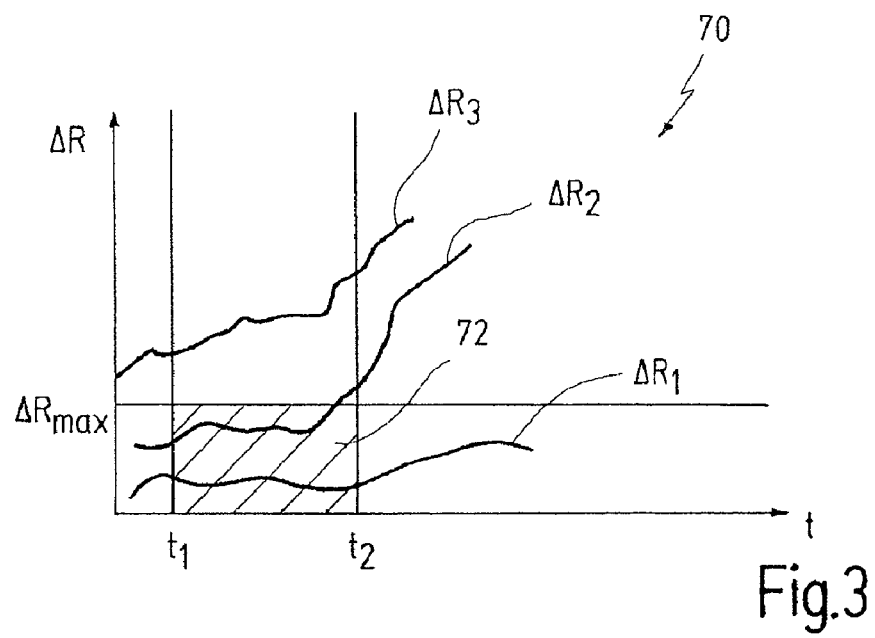
FIG. 3 shows a diagram of a difference between the intended and actual transmission ratios over time.

Steps c) and d) can be explained by way of example on the basis of the diagram of FIG. 3.

In the diagram of FIG. 3, the difference $\Delta R$ is plotted against time. The predefined timespan corresponds, by way of example, to t2-t1, and a predefined maximum difference $\Delta R_{MAX}$ is likewise illustrated.

In this way, for the predefined timespan, a window 72 is defined which illustrates the predefined tolerance range.

If the value of $\Delta R$ is situated in the window 72 at all times (example $\Delta R_1$), then no fault state is present.

The same applies for the example $\Delta R_2$ in which the value of $\Delta R_{MAX}$ is indeed briefly exceeded, but not for the entire predefined timespan t2-t1.

In contrast, for the case of the time profile of $\Delta R_3$, a fault state is determined since the difference $\Delta R_3$ lies outside the tolerance window 72 for the entire predefined timespan.

In the illustration of FIG. 3, it is to be noted that the time profile lines $\Delta R_1$ to $\Delta R_3$ are of purely schematic nature and do not represent the actual ratios in a step-by-step variable transmission, but should rather illustrate the mode of operation of the method according to the invention as per FIG. 2.

Figure 4:
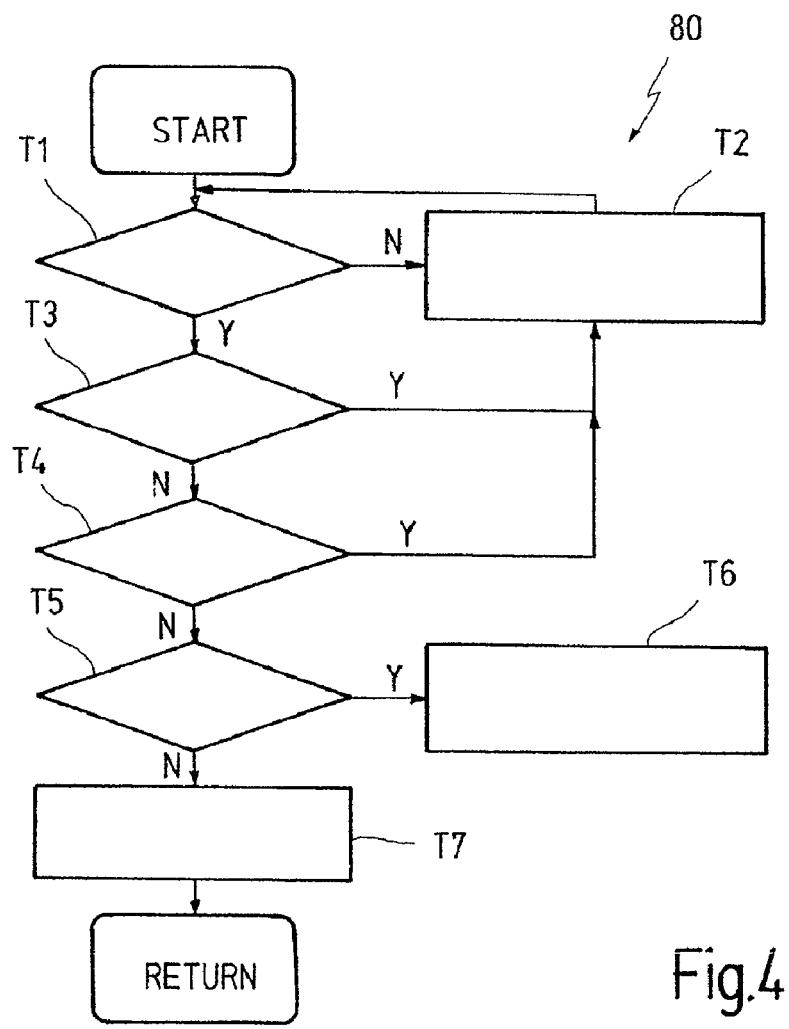
FIG. 4 shows a flow diagram of a further embodiment of the method according to the invention.

FIG. 4 shows a further embodiment of the method according to the invention, which is denoted generally in FIG. 4 by 80.

The method 80 corresponds with regard to the general sequence to the method 60 of FIG. 2, so that only the differences will be explained in the following.

In the method 80, after a start step, a step T1 is carried out, in which it is queried as to whether a shift clutch of a gear stage is being pressed. This can for example be carried out indirectly by means of a current supply to a valve, by means of the current of an electromotive actuator, by means of a pressure sensor or the like.

If it is detected that no gear stage is to be engaged (N in step T1), the state in the step T2 is determined to be correct, and the method returns to the start.

If, however, it is determined in step T1 that a shift clutch is being pressed or an actuator system is being actuated, then it is queried in step T3 as to whether the shift clutch of the gear stage which is to be engaged moves.

Here, a movement within a certain window is considered to be stationary. If, however, a movement takes place over a relatively long time duration, then the method according to the invention detects that the shift clutch is not only being pressed but also shifted. Here, for example, the locking state of the shift clutch which is designed as a locking synchronization device is overcome.

In this case (Y in step T3), it is again determined that all is taking place correctly.

If, when the actuator system is actuated, no movement of the shift clutch is detected over a certain time (N in step T3), then a so-called engagement stuck situation ("Einlegehänger") can be present (a momentary lack of progress in the engagement process).

For this case, it is checked in step T4 as to whether the present transmission ratio (detected by means of the input rotational speed $n_E$ and output rotational speed $n_A$) is appropriate to the transmission ratio of the related gear stage. If this is the case (Y in step T4), then it is merely detected that a brief engagement stuck situation is present, with the function however otherwise being correct, which is determined in step T2.

If the present transmission ratio is however not appropriate to the gear stage which is to be engaged (N in step T4), then a fault is obviously present.

In a first embodiment of the method as per FIG. 4, the method is ended in that the fault state is determined, and further suitable measures are initiated.

In the illustrated preferred embodiment of the method 80, however, a further step T5 is carried out subsequently to this, by virtue of it being detected as to whether the problem is possibly caused by a non-separating separating clutch 14.

Here, consideration is not given to any "clutch open" signal which may be present in the control device. In fact, the engine rotational speed $n_M$ and the transmission input rotational speed $n_E$ are checked. If their difference lies within a certain tolerance window, the clutch (for example despite a corresponding signal from a faulty clutch sensor) is not open but rather is closed. In this case, it is assumed that there is no problem present which would fundamentally disturb the driving operation, and it may even be possible in this case to continue driving. In step T6, therefore (Y in step T5), the fault state is tolerated as long as the separating clutch 14 is closed.

If, however, the check of the separating clutch 14 also indicates that the fault state which has occurred is not caused by the separating clutch 14 (N in step T5), then a considerable fault state is determined in step T7.

Here, an operationally safe state is preferably produced, for example by virtue of no further shifts being permitted. The actuators for the shift clutches are placed into a fail-safe state, for example switched to a currentless state.

It is therefore possible by means of the method 80 in FIG. 4 to detect a fault state, in particular a single fault such as a shift fork breakage, a sensor fault of the gear which is to be engaged or of the gear which is to be disengaged, a software fault, a cabling fault or a control unit hardware fault. In addition, in the event of the detection of a fault state, it is possible for a suitable sequence of steps for maintaining safety to be carried out.

In general, the method according to the invention can be applied to all automated step-by-step variable transmissions in which the transmission input rotational speed $n_E$ and the transmission output rotational speed $n_A$ (or parameters proportional to these) are detected.

If faults in the cabling and/or in the control unit are also to be detected, then additional current detection, pressure detection and/or force detection is to be provided at the shift rod, the shift shaft or a shift drum, respectively.

Although the method is preferably to be used in step-by-step variable transmissions without a mechanical gear lock (gear locking mechanism), it is also conceivable for the method to be used in step-by-step variable transmissions with such a gear lock, since a shift fork breakage can also occur there.

It is however advantageous overall by means of the method 60, 80 according to the invention that a mechanical gear lock can be dispensed with. It is prevented that more than one gear is engaged simultaneously.

It is self-evident that the method 60, 80 according to the invention is preferably carried out only when drive is being provided by means of the step-by-step variable transmission 16 (when the vehicle is driving). It is also self-evident that the methods 60, 80 are carried out cyclically, for example every 2, 4, 10, . . . , 320 milliseconds.

It is generally advantageous with the method according to the invention that locking of the drive axle is avoided.

Although a locking synchronization device already prevents a further gear from being engaged above a certain minimum speed for a certain time, the method according to the invention is however carried out in order that the loading limit of the synchronization device is not exceeded.

In addition, for general understanding, the following is explained for a specific embodiment with hydraulic actuation of individual shift rods for the shift clutch packs of the step-by-step variable transmission.

If a valve of a hydraulic actuator for an individual shift rod is supplied with current (current or force above a threshold value, that is to say a value above which a reaction to the current supply can be expected), then according to logic, the associated shift rod must also move. If said shift rod does not move, then a gear cannot be either engaged or disengaged. This could also be a sensor fault. If a gear cannot be disengaged, then the present transmission ratio must be appropriate to the gear at which no movement can presently be diagnosed. In this case, an engagement stuck situation is present. In the case of an engagement stuck situation—without another gear being engaged—the transmission ratio can either be appropriate to the unsynchronized gear or not. However, it is not possible, or at least extremely improbable, that the transmission ratio is appropriate to a gear stage other than the unsynchronized gear stage for a relatively long time (predefined timespan t2-t1). If, however, a gear stage other than the gear stage whose associated shift rod has been detected as being stationary and supplied with current is engaged, then the transmission ratio must be appropriate to an already-engaged gear. If such a fault is detected, the shift must be aborted and the actuator system shut down. A special case here still is the non-separating clutch, as described above.

What is claimed is:

1. A method for controlling an automated step-by-step variable transmission, with the step-by-step variable transmission having a plurality of gear stages which set up a different transmission ratio in each case, having the steps:
   a) detecting whether a gear stage is to be engaged by determining the actuation of a corresponding shift clutch of the gear stage,
   b) detecting an input actual variable which is substantially proportional to an input rotational speed of the step-by-step variable transmission, and an output actual variable which is substantially proportional to an output rotational speed of the transmission,
   c) checking as to whether a difference between a ratio of the input and the output actual variables and the transmission ratio which would be set up by the gear stage is smaller for predefined timespan, $t_2-t_1$, than a predefined tolerance range, wherein the predefined timespan prevents incorrect evaluations on account of a transient state, and
   d) determining a fault state if the difference does not lie within the tolerance range for the predefined timespan.

2. The method according to claim 1, wherein the steps a) to d) are carried out when another gear stage is already engaged.

3. The method according to claim 1, wherein the steps a) to d) are carried out when the output actual variable is greater than a predefined threshold value.

4. The method according to claim 1, wherein detecting whether a gear stage is to be engaged is accomplished by detecting whether an electrical activating current which is supplied to an actuator which is assigned to the gear stage is greater than a current threshold value.

5. The method according to claim 1, wherein detecting whether a gear stage is to be engaged is accomplished by detecting a force, with which a shift member for engaging the gear stage is moved.

6. The method according to claim 1, wherein detecting whether a gear stage is to be engaged is accomplished by detecting a fluid pressure of a fluid actuator, by means of which a shift member for engaging the gear stage is actuated.

7. The method according to claim 1, wherein after the determination of the fault state, detecting whether a separating clutch device which is connected to the input of the transmission is separated or not.

8. A method for early detection of a fault in an automated step-by-step variable transmission, wherein, when a gear stage is already engaged, determining by monitoring and checking a plurality of parameters of the transmission as to whether an impermissible attempt is being carried out to engage a further gear stage, wherein the monitoring and checking step is made by:
  a) detecting whether the further gear stage is to be engaged by determining the actuation of a corresponding shift clutch of the gear stage,
  b) detecting an input actual variable which is substantially proportional to an input rotational speed of the step-by-step variable transmission, and an output actual variable which is substantially proportional to an output rotational speed of the transmission,
  c) checking as to whether a difference between a ratio of the input and the output actual variables and the transmission ratio which would be set up by the further gear stage is smaller for a predefined timespan, $t_2$-$t_1$, than a predefined tolerance range, wherein the predefined timespan prevents incorrect evaluations on account of a transient state, and
  d) determining a fault state if the difference does not lie within the tolerance range for the predefined timespan.

9. An automated step-by-step variable transmission, having a plurality of gear stages which set up a different transmission ratio in each case, wherein the gear stages are engaged and disengaged by means of associated actuators, and having a control device for activating the actuators,
  wherein the control device detects whether a gear stage is to be engaged by determining the actuation of a corresponding shift clutch of the near stage, detects an input actual variable which is substantially proportional to an input rotational speed of the step-by-step variable transmission, and an output actual variable which is substantially proportional to an output rotational speed of the transmission, checks as to whether a difference between a ratio of the input and the output actual variables and the transmission ratio which would be set up by the gear stage is smaller for a predefined timespan, $t_2$-$t_1$, than a predefined tolerance range, wherein the predefined timespan prevents incorrect evaluations on account of a transient state, and determines a fault state if the difference does not lie within the tolerance range for the predefined timespan.

10. The automated step-by-step variable transmission according to claim 9, wherein the step-by-step variable transmission has no mechanical gear lock.

11. The automated step-by-step variable transmission according to claim 9, wherein the gear stages can be engaged by means of synchronized shift clutches.

* * * * *